US012404884B2

(12) United States Patent
Schmidt et al.

(10) Patent No.: US 12,404,884 B2
(45) **Date of Patent: *Sep. 2, 2025**

(54) CYCLONIC FLOW-INDUCING PUMP

(71) Applicant: Vortex Pipe Systems LLC, Austin, TX (US)

(72) Inventors: Paul Wayne Schmidt, Carlton, OR (US); Avijit Ghosh, Austin, TX (US)

(73) Assignee: Vortex Pipe Systems LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/660,553

(22) Filed: May 10, 2024

(65) Prior Publication Data

US 2024/0288013 A1 Aug. 29, 2024

Related U.S. Application Data

(63) Continuation of application No. 17/542,200, filed on Dec. 3, 2021, now Pat. No. 12,012,980, which is a (Continued)

(51) Int. Cl.

*F15C 1/18* (2006.01)
*B01F 25/4314* (2022.01)

(Continued)

(52) U.S. Cl.

CPC ............ *F15C 1/18* (2013.01); *B01F 25/4314* (2022.01); *B01F 25/432* (2022.01);

(Continued)

(58) Field of Classification Search

CPC .......... F15C 1/18; B01F 5/0614; B01F 5/064; B01F 5/0651; B01F 5/0659; B01F 5/12;

(Continued)

(56) References Cited

U.S. PATENT DOCUMENTS 1,496,345 A 6/1924 Lichtenhaeler
1,500,103 A 7/1924 Burdon et al.

(Continued)

FOREIGN PATENT DOCUMENTS

CN 111536051 8/2022
DE 10054669 2/2002

(Continued)

OTHER PUBLICATIONS

International Search Authority, Notification of Transmittal of the International Search Report and Written Opinion of the International Search Authority, PCT/US2019/0151468, 14 pages.

(Continued)

*Primary Examiner* — Charles Cooley
(74) *Attorney, Agent, or Firm* — David O. Simmons; IVC Patent Agency

(57) ABSTRACT

Disclosed cyclonic flow-inducing pumps overcome drawbacks associated with known adverse flow conditions that arise from flow of certain types of materials through a material flow conduit. Such cyclonic flow-inducing pumps provide for flow of flowable material within a flow passage of a material flow conduit (e.g., a portion of a pipeline, tubing or the like) to have a cyclonic flow (i.e., vortex or swirling) profile. Advantageously, the cyclonic flow profile centralizes flow toward the central portion of the flow passage, thereby reducing magnitude of laminar flow. Such cyclonic flow profile provides a variety of other advantages as compared to a parabolic flow profile such as, for example, increased flow rate, reduce inner pipeline wear, more uniform inner pipe wear, reduction in energy consumption, reduced or eliminated adverse considerations such as slugging.

18 Claims, 10 Drawing Sheets

Related U.S. Application Data continuation-in-part of application No. 17/462,896, filed on Aug. 31, 2021, now Pat. No. 11,221,028, which is a continuation of application No. 16/991,270, filed on Aug. 12, 2020, now Pat. No. 11,391,309, which is a continuation of application No. 16/846,474, filed on Apr. 13, 2020, now Pat. No. 10,895,274, which is a continuation of application No. 16/567,379, filed on Sep. 11, 2019, now Pat. No. 10,683,881, which is a continuation of application No. 16/445,127, filed on Jun. 18, 2019, now Pat. No. 10,458,446.

(60) Provisional application No. 63/125,556, filed on Dec. 15, 2020, provisional application No. 62/917,233, filed on Nov. 29, 2018.

(51) Int. Cl.
*B01F 25/432* (2022.01)
*B01F 25/433* (2022.01)
*B01F 25/435* (2022.01)
*B01F 25/60* (2022.01)
*B01F 29/00* (2022.01)
*B01F 29/25* (2022.01)

(52) U.S. Cl.
CPC ........ *B01F 25/4334* (2022.01); *B01F 25/435* (2022.01); *B01F 25/60* (2022.01); *B01F 29/252* (2022.01); *B01F 29/40113* (2022.01); *B01F 29/40221* (2022.01)

(58) Field of Classification Search
CPC .. B01F 7/00541; B01F 9/0007; B01F 9/0009; B01F 9/001; B01F 9/0041; B01F 2009/0092; B01F 25/4314; B01F 25/432; B01F 25/4334; B01F 25/435; B01F 25/60; B01F 29/252; B01F 29/40113; B01F 29/40221; F04D 3/00
See application file for complete search history.

(56) References Cited

U.S. PATENT DOCUMENTS

| | | | | | |
|---|---|---|---|---|---|
| 1,513,624 | A | | 10/1924 | Parker | |
| 1,777,141 | A | | 9/1930 | Howden | |
| 1,959,907 | A | | 5/1934 | Ebert | |
| 1,974,110 | A | | 9/1934 | Higley | |
| 2,274,599 | A | | 2/1942 | Freeman | |
| 2,300,130 | A | * | 10/1942 | McCurdy | F01N 1/12 181/274 |
| 2,784,948 | A | | 3/1957 | Pahl et al. | |
| 2,816,518 | A | | 12/1957 | Daggett | |
| 2,831,754 | A | * | 4/1958 | Manka | B01D 11/0473 423/658.5 |
| 4,204,775 | A | | 5/1980 | Speer | |
| 4,339,918 | A | | 7/1982 | Michikawa | |
| 5,743,637 | A | | 4/1998 | Ogier | |
| 5,909,959 | A | | 6/1999 | Gerich | |
| 5,992,465 | A | | 11/1999 | Jansen | |
| 8,033,714 | B2 | | 10/2011 | Nishioka et al. | |
| 8,864,367 | B2 | * | 10/2014 | Hanada | B01F 5/0647 366/339 |
| 10,092,886 | B2 | | 10/2018 | Kashihara et al. | |
| 10,093,953 | B2 | * | 10/2018 | Gordon | C12P 7/04 |
| 10,201,786 | B2 | * | 2/2019 | Okada | B01F 5/0644 |
| 10,272,402 | B2 | * | 4/2019 | Tun | B01F 3/18 |
| 10,302,104 | B2 | * | 5/2019 | Schmidt | F16L 55/02772 |
| 10,458,446 | B1 | * | 10/2019 | Schmidt | B01F 5/0651 |
| 10,683,881 | B1 | * | 6/2020 | Schmidt | B01F 5/0614 |
| 10,844,887 | B1 | * | 11/2020 | Schmidt | E03F 3/02 |
| 10,890,200 | B2 | * | 1/2021 | Schmidt | B01F 5/0659 |
| 10,895,274 | B2 | * | 1/2021 | Schmidt | B01F 5/0614 |
| 11,002,301 | B1 | * | 5/2021 | Schmidt | F15D 1/065 |
| 11,085,470 | B2 | * | 8/2021 | Leutwyler | F04B 53/16 |
| 11,221,028 | B1 | * | 1/2022 | Schmidt | B01F 29/40113 |
| 11,247,758 | B1 | * | 2/2022 | Schmidt | B63H 11/103 |
| 11,319,974 | B2 | * | 5/2022 | Schmidt | B01F 25/432 |
| 11,378,110 | B1 | * | 7/2022 | Schmidt | F15D 1/02 |
| 11,391,309 | B2 | * | 7/2022 | Schmidt | B01F 25/435 |
| 11,460,056 | B2 | * | 10/2022 | Schmidt | F16L 57/06 |
| 11,713,764 | B1 | * | 8/2023 | Schmidt | F04D 13/08 415/173.1 |
| 11,739,774 | B1 | * | 8/2023 | Schmidt | F15D 1/0015 138/37 |
| 12,006,957 | B2 | * | 6/2024 | Schmidt | B01F 25/435 |
| 12,012,980 | B2 | * | 6/2024 | Schmidt | B01F 25/4334 |
| 2010/0307830 | A1 | | 12/2010 | Curlett | |
| 2012/0285173 | A1 | | 11/2012 | Poyyapakkam et al. | |
| 2016/0270893 | A1 | | 9/2016 | Tapocik | |
| 2017/0306994 | A1 | * | 10/2017 | Schmidt | F16L 55/02772 |
| 2019/0242413 | A1 | * | 8/2019 | Schmidt | F16L 43/00 |
| 2020/0173467 | A1 | * | 6/2020 | Schmidt | B01F 5/0614 |
| 2020/0173468 | A1 | * | 6/2020 | Schmidt | B01F 5/0614 |
| 2020/0263712 | A1 | * | 8/2020 | Schmidt | B01F 5/0659 |
| 2020/0370572 | A1 | * | 11/2020 | Schmidt | B01F 5/064 |
| 2020/0370573 | A1 | * | 11/2020 | Schmidt | F16L 55/02772 |
| 2021/0071692 | A1 | * | 3/2021 | Schmidt | F16L 55/02772 |
| 2021/0396252 | A1 | * | 12/2021 | Schmidt | B01F 25/60 |
| 2022/0090613 | A1 | * | 3/2022 | Schmidt | B01F 25/432 |
| 2022/0299049 | A1 | * | 9/2022 | Schmidt | B01F 25/432 |
| 2024/0288012 | A1 | * | 8/2024 | Schmidt | B01F 25/435 |
| 2024/0288013 | A1 | * | 8/2024 | Schmidt | B01F 25/60 |
| 2024/0410369 | A1 | * | 12/2024 | Schmidt | F04D 29/548 |

FOREIGN PATENT DOCUMENTS

| | | | | | |
|---|---|---|---|---|---|
| EP | 1134476 | A1 | | 9/2001 | |
| FR | 2614554 | A1 | * | 11/1988 | B01F 5/0057 |
| GB | 747576 | A | * | 4/1956 | B28C 5/1806 |
| GB | 971918 | | | 10/1964 | |
| GB | 971918 | A | * | 10/1964 | B01F 9/025 |
| GB | 2312276 | A | | 10/1997 | |
| KR | 100803918 | B | | 2/2008 | |
| RU | 2670283 | C1 | | 10/2018 | |

OTHER PUBLICATIONS

International Search Authority, Notification of Transmittal of the International Search Report and Written Opinion of the International Search Authority, PCT/US2021/061866, 8 pages.
European Patent Office, Extended European Search Report, 21907462.2-1004, 10 pages.

* cited by examiner

-PRIOR ART-

CYCLONIC FLOW-INDUCING PUMP

CROSS-REFERENCE TO RELATED APPLICATIONS

This patent application is a continuation of U.S. Non-Provisional patent application Ser. No. 17/542,200, filed 3 Dec. 2021, entitled "CYCLONIC FLOW-INDUCING PUMP", now U.S. Pat. No. 12,012,980, which claims priority as a continuation of U.S. Non-Provisional patent application Ser. No. 17/462,896, filed 31 Aug. 2021, entitled "ROTARY IN-LINE PUMP", now U.S. Pat. No. 11,221,028, which claims priority as a continuation-in-part from U.S. Non-Provisional patent application Ser. No. 16/991,270, filed 12 Aug. 2020, entitled "MATERIAL FLOW AMPLIFIER", now U.S. Pat. No. 11,391,309 and from U.S. Provisional Patent Application No. 63/125,556, filed Dec. 15, 2020, entitled "ROTARY IN-LINE PUMP," each having a common applicant herewith and being incorporated herein in their entirety by reference. Non-Provisional patent application Ser. No. 16/991,270 claims priority from U.S. Non-Provisional patent application Ser. No. 16/846,474, filed 13 Apr. 2020, now U.S. Pat. No. 10,895,274, entitled "MATERIAL FLOW AMPLIFIER", having a common applicant herewith and being incorporated herein in its entirety by reference. Non-Provisional patent application Ser. No. 16/846,474 claims priority as continuation patent application from U.S. Non-Provisional patent application Ser. No. 16/567,379, filed 11 Sep. 2019, now U.S. Pat. No. 10,683,881, entitled "MATERIAL FLOW AMPLIFIER", having a common applicant herewith and being incorporated herein in its entirety by reference. Non-Provisional patent application Ser. No. 16/567,379 claims priority as continuation patent application from U.S. Non-Provisional patent application Ser. No. 16/445,127, filed 18 Jun. 2019, now U.S. Pat. No. 10,458,446, entitled "MATERIAL FLOW AMPLIFIER", having a common applicant herewith and being incorporated herein in its entirety by reference. U.S. Non-Provisional patent application Ser. No. 16/445,127 claims priority from co-pending United States Provisional Patent Application having Ser. No. 62/917,233, filed 29 Nov. 2018, entitled "MULTI-CHAMBERED VORTEX PIPELINE AMPLIFIER (FULLY PIGGABLE)", having a common applicant herewith and being incorporated herein in its entirety by reference.

FIELD OF THE DISCLOSURE

The disclosures made herein relate generally to pumps for flowable materials and, more particularly, to rotary in-line pumps for flowable materials and preferably for liquid materials.

BACKGROUND

The need to generate pressurized flow by imparting a pumping action on a flowable material or other suitably viscous form of material through a material flow conduit (i.e., a pumpable material) is well known. Examples of such material flow conduit include, but are not limited to, pipes, pipelines, conduits, tubular flow members, and the like. The pumping action is provided by a pump to increase a pressure of the flowable material at an outlet of the pump and thereby increases flow velocity of the flowable material downstream of the pump.

As shown in FIG. 1, conventional flow of flowable material 5 within a flow passage 10 of material flow conduit 15 has a flow profile characterized by laminar flow effect (i.e., laminar flow 20). The parabolic flow profile is a result of the laminar boundary layer along the surface of the material flow conduit 15 defining the flow passage 10. Flowable material at the surface of the flow passage 10 exhibits considerable friction and zero flow velocity, thereby reducing velocity of the flowable material even at a considerable distance from the surface of the flow passage 10. In association with this reduced velocity, the laminar flow effect (e.g., friction at the surface of the material flow conduit) is known to increase head loss and heating of the flowable material.

There are various well-known flow considerations that arise when a flowable material and, particularly abrasive flowable material, flows through a material flow conduit such as a pipeline. One such consideration is erosion (i.e., wearing) of the material flow conduit. Transport and pumping flowable material comprising abrasive contents, such as coal and sand slurries, wet sand, gravel and the like can cause especially high costs associated with component wear due to interaction between the flowable material and the surface defining the passage through which such material flows. Additionally, uneven erosion in piping systems, especially elbow fittings, is well known to lead to fitting failure or early fitting replacement, either of which is costly in material, manpower and downtime.

When flowable materials pass through an elbow fitting, the change in direction creates turbulent conditions, flow separation and vortex shedding along the pipe wall at the inside of the bend of the elbow fitting. This change in direction may also create standing eddies causing backflow conditions at points along the elbow fitting pipe walls. These conditions generally cause the elbow fitting pipe wall along the outside of the bend to erode substantially faster than the pipe wall along the inside of the bend because the flowable material impinges directly against the wall along the outside of the bend as it enters the fitting and changes direction. Additionally, due to centrifugal force, heavier solids and particulates are generally thrown to the outside wall as the flowable material changes direction and tend to continually scour the outer wall.

A similar uneven erosion effect is often experienced in straight pipe runs. For example, the concentration of particulates of a flowable material will increase in the lower region of the fluid in long straight runs (i.e., particulate dropping out of suspension), making the bottom portion of the fluid stream more abrasive or prone to material deposition and/or aggregation than the upper portion. Such material deposition and/or aggregation can alter fluid flow conditions (e.g., velocity, temperature, pressure and the like) and can alter the material composition of the flowable material (e.g., less downstream concentration of particular material than required or intended). Additionally, in large diameter piping systems, the weight of the flowable material is borne by the lower pipe wall portion thereby causing higher erosion rates.

Another well-known flow consideration that arises is head loss due to turbulence and flow separation in an elbow fitting. Higher pumping pressures can be utilized for mitigating this head loss resulting from such head losses. However, higher pumping pressures are generally implemented at the expense of higher energy consumption and associated cost. Additionally, implementation of higher pumping pressures often creates vibration and heating problems in the piping system.

Long radius elbow fittings and pipe sections can reduce these adverse flow considerations. However, long radius fittings require a great deal of space relative to standard (i.e., short) radius fittings. Additionally, long radius fittings still suffer accelerated erosion rates along the pipe wall along the outside of the bend because centrifugal force still causes heavier, more abrasive flowable materials to be thrown to the outer wall, and they are continually scoured by on-going flow of such flowable material.

Therefore, a pump adapted to produce material flow characteristics that overcome drawbacks associated with known flow considerations that arise from flow of flowable materials flowing through a material flow conduit would be beneficial, desirable and useful.

SUMMARY OF THE DISCLOSURE

Embodiments of the disclosures made herein are directed to a pump adapted to produce material flow characteristics that overcome drawbacks associated with known adverse flow conditions in pipe structures through a material flow conduit. In preferred embodiments, the pump is a rotary in-line pump that can be connected between two sections of material flow conduit. A pump in accordance with one or more embodiments of the disclosures made herein provides for flow of flowable material within a flow passage of a material flow conduit (e.g., a portion of a pipeline, tubing or the like) to have a cyclonic flow (i.e., whirlpool, vortex or rotational) profile. Advantageously, such a cyclonic flow profile centralizes flow toward the central portion of the flow passage, thereby reducing the magnitude of laminar flow. Such cyclonic flow profile is also known to provide a variety of other advantages as compared to a parabolic flow profile resulting from laminar flow—e.g., increased flow rate, reduce inner pipeline wear, more uniform inner pipe wear, reduction in energy consumption, reduced or eliminated slugging and the like.

In one or more embodiments of the disclosures made herein, a rotary in-line pump comprises a material pressurizer and a plurality of mounting units attached thereto. The material pressurizer including a plurality of helical flow passages each jointly defined by a respective portion of an exterior body, a respective portion of a centralizer tube and adjacent ones of a plurality of helical vanes that extended between the exterior body and the centralizer tube at least partially along a length of the exterior body. A longitudinal centerline axis of the exterior body and a longitudinal centerline axis of the centralizer tube extend colinearly with a longitudinal reference axis. Each of the helical flow passages includes a divergent portion having increasing cross-sectional area along a first portion of a length of the exterior body and a convergent portion having decreasing cross-sectional area along a second portion of a length of the exterior body. The convergent portion is in fluid communication with and extends from the divergent portion such that each of the helical flow passages is contiguous along a length thereof. The plurality of mounting units each have a support body and a bearing assembly. An upstream one of the mounting units has the bearing assembly thereof engaged with an upstream portion of the exterior body. A downstream one of the mounting units has the bearing assembly thereof engaged with a downstream portion of the exterior body. A centerline longitudinal axis of the bearing assembly of the upstream one of the mounting units and a centerline longitudinal axis of the bearing assembly of the downstream one of the mounting units each extend colinearly with the longitudinal reference axis thereby enabling the material pressurizer to rotate in a radially constrained manner about the longitudinal reference axis.

In one or more embodiments of the disclosures made herein, a rotary in-line pump system comprises a material pressurizer, a plurality of mounting units and a drive apparatus. The material pressurizer includes an exterior body, a plurality of helical vanes within an interior space of the exterior body and a centralizer tube within the interior space of the exterior body. The exterior body includes a conically divergent section and a conically convergent section. The conically divergent section and the conically convergent section each have an upstream end portion and a downstream end portion. The downstream end portion of the conically divergent section is attached to the upstream end portion of the conically convergent section. A longitudinal centerline axis of the conically divergent section, a longitudinal centerline axis of the conically convergent section and a longitudinal centerline axis of the centralizer tube extend colinearly with a longitudinal reference axis. Each of the helical vanes extends between an interior surface of the exterior body and an exterior surface of the centralizer tube at least partially along a length of the exterior body to define a plurality of helical flow passages extending between the exterior body, the centralizer tube and adjacent ones of the helical vanes. The plurality of mounting units each have a support body and a bearing assembly. An upstream one of the mounting units has the bearing assembly thereof engaged with the conically divergent section of the exterior body. A downstream one of the mounting units has the bearing assembly thereof engaged with the conically convergent section of the exterior body. A centerline longitudinal axis of the bearing assembly of the upstream one of the mounting units and a centerline longitudinal axis of the bearing assembly of the downstream one of the mounting units each extend colinearly with the longitudinal reference axis thereby enabling the material pressurizer to rotate about the longitudinal reference axis. The drive apparatus is engaged with the material pressurizer and exerts rotational force on the material pressurize for causing the material pressurizer to rotate about the longitudinal reference axis.

In one or more embodiments, the centralizer tube has a uniform outside diameter.

In one or more embodiments, the centralizer tube has a cylindrical cross-sectional profile.

In one or more embodiments, the exterior body has a first tapered section defining a profile of the divergent portion of each of the helical flow passages and a second tapered portion defining a profile of the convergent portion of each of the helical flow passages.

In one or more embodiments, the exterior body includes a conically divergent section and a conically convergent section, the conically divergent section and the conically convergent section each have an upstream end portion and a downstream end portion, the downstream end portion of the conically divergent section is attached to the upstream end portion of the conically convergent section, and a longitudinal centerline axis of the conically divergent section and a longitudinal centerline axis of the conically convergent section each extend colinearly with the longitudinal reference axis.

In one or more embodiments, each of the helical flow passages extends along an entire length of the centralizer tube.

In one or more embodiments, each of the helical flow passages and a central passage of the centralizer tube terminate at a flow mixer section of the material pressurizer.

In one or more embodiments, an inside diameter of the centralizer tube is uniform over an entire length of thereof.

In one or more embodiments, an inside diameter of the centralizer tube is non-uniform over at least a portion of a length of thereof.

In one or more embodiments, at least one helical projection is on an interior surface of the central passage of the centralizer tube.

In one or more embodiments, the at least one helical projection extends at least partially along an entire length of the centralizer tube.

In one or more embodiments, a pitch of the at least one helical projection is the same as a pitch of each of the helical flow passages.

In one or more embodiments, a maximum inside diameter of the exterior body is at least 4 times the inside diameter of the centralizer tube and a minimum inside diameter of the exterior body is approximately the same as the inside diameter of the centralizer tube.

In one or more embodiments, an inlet of each of the helical flow passages and an inlet of the centralizer tube all lie in a common plane.

In one or more embodiments, the exterior body includes a material inlet body at an upstream end portion thereof and a material outlet body at a downstream end portion thereof.

In one or more embodiments, a longitudinal centerline axis of the material inlet body and a longitudinal centerline axis of the material outlet body each extend colinearly with the longitudinal reference axis.

In one or more embodiments, the material inlet body, the material outlet body and the centralizer tube each have a common inside diameter that is uniform over an entire length of thereof.

In one or more embodiments, the material outlet body and the centralizer tube each have a common inside diameter that is uniform over an entire length of thereof.

In one or more embodiments, at least about 80% of a length of the centralizer tube resides within an interior space of the exterior body defined by a conically convergent section thereof.

These and other objects, embodiments, advantages and/or distinctions of the present invention will become readily apparent upon further review of the following specification, associated drawings and appended claims.

DETAILED DESCRIPTION

Embodiments of the disclosures made herein are directed to rotary in-line pumps that provide for increased volumetric flow rates for flowable material (e.g., fluids, slurries, and the like) and for associated reductions in wear to material flow conduits through which flow of such flowable materials is provided. Rotary in-line pumps in accordance with embodiment of the disclosures made herein induce a cyclonic flow profile (i.e., rotational, vortex or swirling movement) that advantageously overcomes drawbacks associated with known adverse flow conditions (e.g., internal pipe wall erosion, head losses, material heating) that can arise from flow of various types of flowable materials flowing through a material flow conduit in a conventional manner (e.g., under laminar flow effect). Rotary in-line pumps in accordance with embodiment of the disclosures made herein can be mounted and operated in any angular orientation (i.e., omni-directionally mountable).

Figure 1:
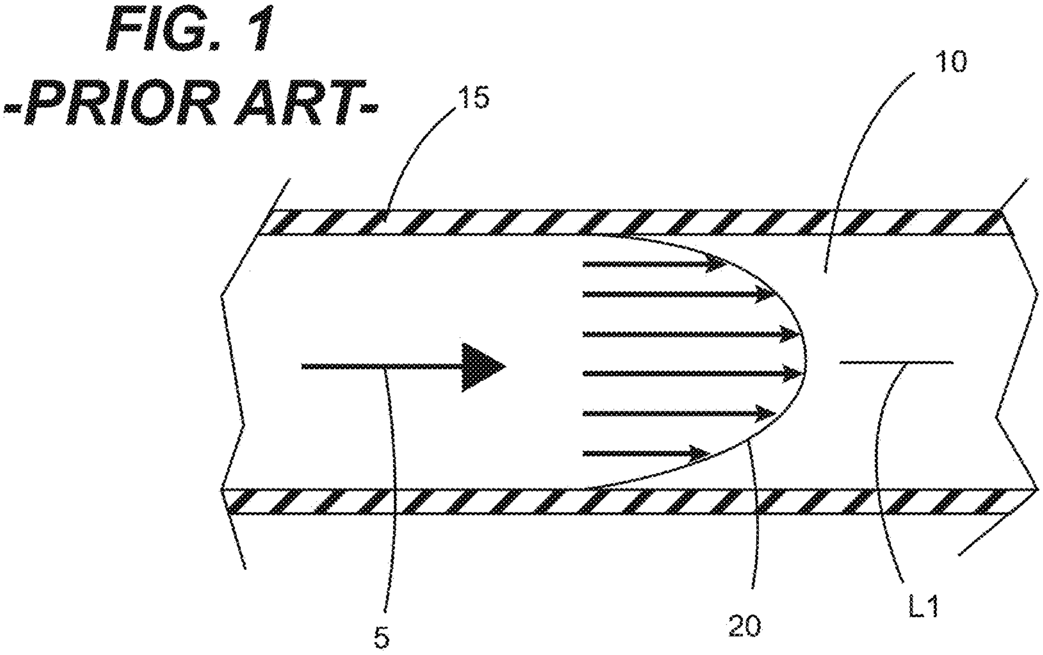
FIG. 1 is a diagrammatic view showing laminar flow effect within a material flow conduit.
Figure 2:
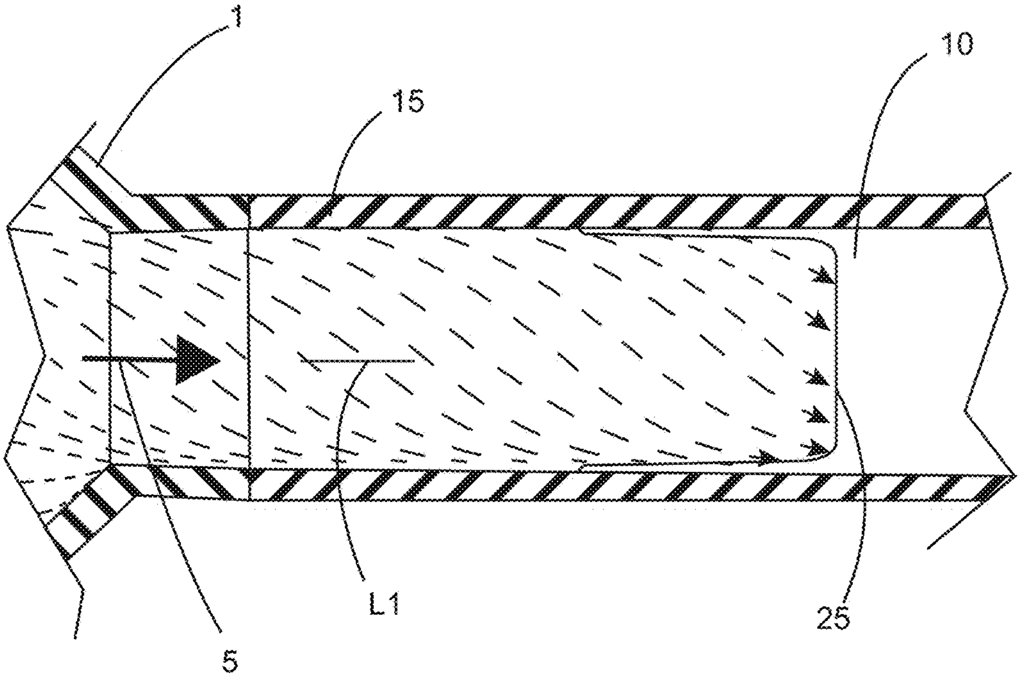
FIG. 2 is a diagrammatic view showing conversion from a laminar flow effect to cyclonic flow effect by a rotary in-line pump configured in accordance with one or more embodiments of the disclosures made herein.

As discussed above in reference to FIG. 1, conventional of flowable material 5 within a flow passage 10 of a material flow conduit 15 has a flow profile characterized by laminar flow effect (i.e., laminar flow 20). However, advantageously, a rotary in-line pump 1 in accordance with one or more embodiments of the disclosures made herein is configured in a manner that causes conventional flow to be transformed from a flow profile characterized by laminar flow effect to a flow profile being characterized by cyclonic flow effect (i.e., cyclonic flow 25). Cyclonic flow effect is the result of cyclonic movement of the flowable material 5 (i.e., sometime also referred to as cyclonic, whirlpool or vortex flow effect) about the longitudinal axis L1 of the material flow conduit 15 as generated by the rotary in-line pump 1. As a person or ordinary skill in the art will understand (e.g., as depicted in FIGS. 1 and 2), cyclonic flow provides greater average flow velocity and volumetric flow than laminar flow for a given material flow conduit. Additionally, cyclonic flow mitigates adverse interaction between the surface of the material flow conduit and the flowable material. These advantageous aspects of cyclonic flow arise from the cyclonic flow profile accelerating and centralizing flow of the flowable material toward the central portion of the flow passage 10, thereby mitigating associated adverse flow conditions and amplifying flow magnitude.

As will also become apparent from the disclosures made herein, a rotary in-line pump in accordance with embodiments of the disclosures made herein advantageously drives flowable material flow toward a focal point along a centerline axis of the rotary in-line pump (and thus the downstream flow conduit). Without this focal point functionality, material flow leaving the rotary in-line pump would be that of a centrifuge—i.e., material being undesirably accelerated and driven toward the interior surface of the material flow conduit. In contrast, by driving the flowable material toward the centerline axis of the material flow conduit via helical flow passages, the amount of flowable material at the interior surface of the material flow conduit is greatly reduced as compared to laminar flow or centrifuge-induced flow. Additionally, by driving flowable material flow toward the focal point of the rotary in-line pump, a portion of the flowable material (i.e., generally non-rotating flowable material) can become trapped between the inside surface of the material flow conduit (e.g., pipeline) and the exterior boundary of the rotationally flowing flowable material, thereby becoming an interface material for the rotationally flowing flowable material that serves to lower the effective coefficient of friction exhibited at the exterior boundary of the rotationally flowing flowable material (i.e., flowing of flowable material upon like material as opposed to material of the material flow conduit). Accordingly, in view of the material flow being driven toward the centerline axis of the rotary in-line pump (i.e., toward the focal point of the rotary in-line pump), the cyclonic flow profile provided for by rotary in-line pumps in accordance with embodiments of the disclosures made herein is propagated along the material flow conduit (e.g., because a large amount of the side wall drag is eliminated) and wear is thus dramatically reduced.

To maintain the beneficial effects of cyclonic flow, one or more additional rotary in-line pumps can be provided downstream of an initial rotary in-line pump. The distance between rotary in-line pumps can be proportional to system attributes such as, for example, pipe size, volume of fluid desired flow rates, pipeline's layout, terrain (e.g., elevation grade) and the like. The objective of placement and configuration of the rotary in-line pump is to reduce side wall drag, thereby increasing flow and utilizing the full potential of the cross-sectional flow area of a material flow conduit.

In a conventional pipe structure, internal pipe wear occurs unevenly because of the concentration of wear particles scuffing the lowest area of the pipe. In a conventional piping system heavier particle fall out and drag along the bottom of the pipe structure. The cyclonic action provided for by rotary in-line pumps in accordance with the disclosures made herein keeps particles suspended. In all flow directional changes such as in elbow pipes, the same particles are thrown to the outside as if it were in a centrifuge. In contrast, cyclonic flow as provided for by rotary in-line pumps in accordance with one or more embodiments of the disclosures made herein acts to focus flowable material flow through more uniformly across the centerline and cross-section portion of the of the material flow conduit with less boundary layer contact. Thus, the use of one or more rotary in-line pumps in accordance with one or more embodiments of the disclosures made herein can mitigate uneven wear, erosion and the like within material flow conduit.

Figure 3:
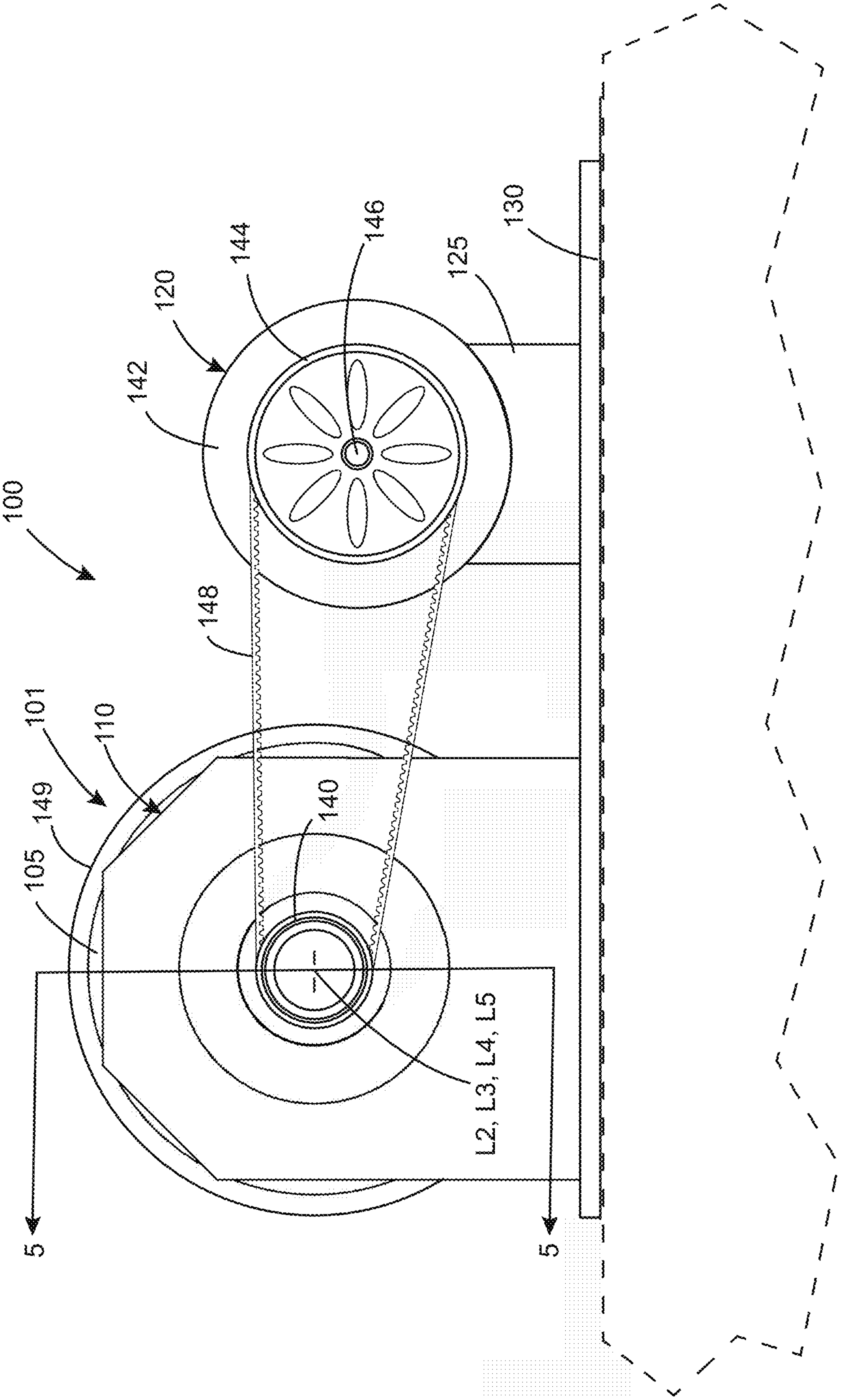
FIG. 3 is a diagrammatic end view showing a rotary in-line pump system configured in accordance with one or more embodiments of the disclosures made herein.
Figure 4:
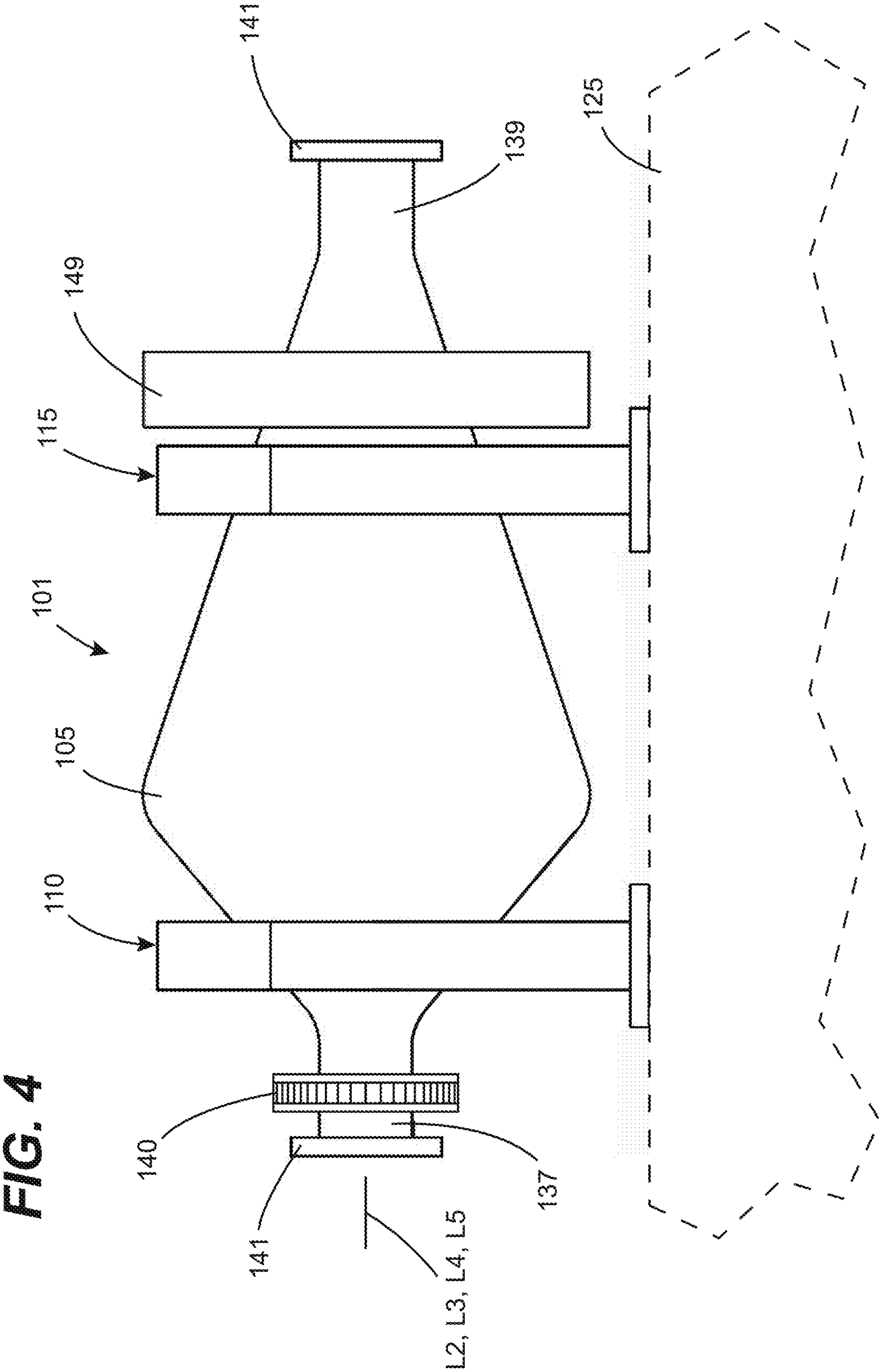
FIG. 4 is a diagrammatic side view showing a rotary in-line pump of the rotary in-line pump system of FIG. 3.
Figure 5:
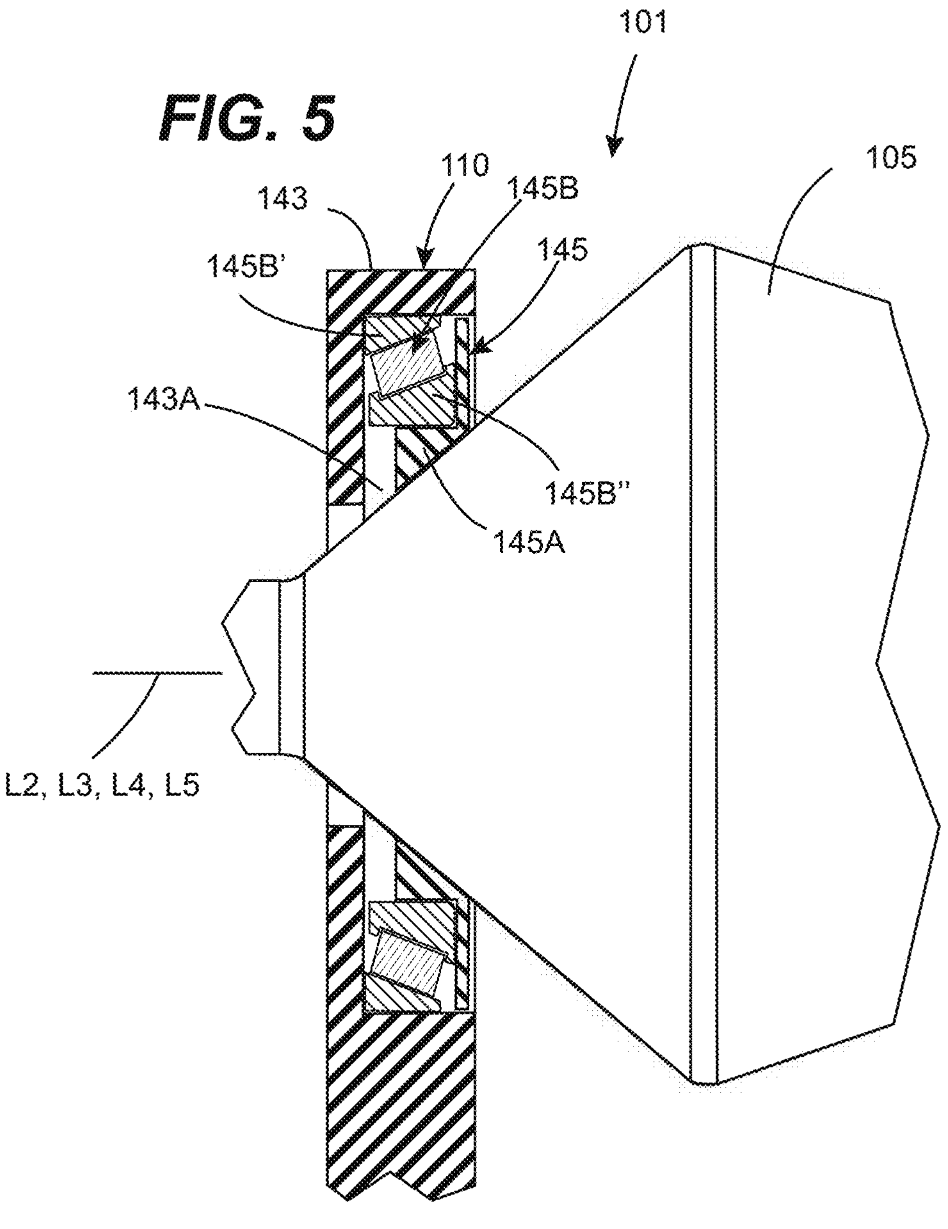
FIG. 5 is a fragmentary cross-sectional view taken along the line 5-5 in FIG. 3.
Figure 6:
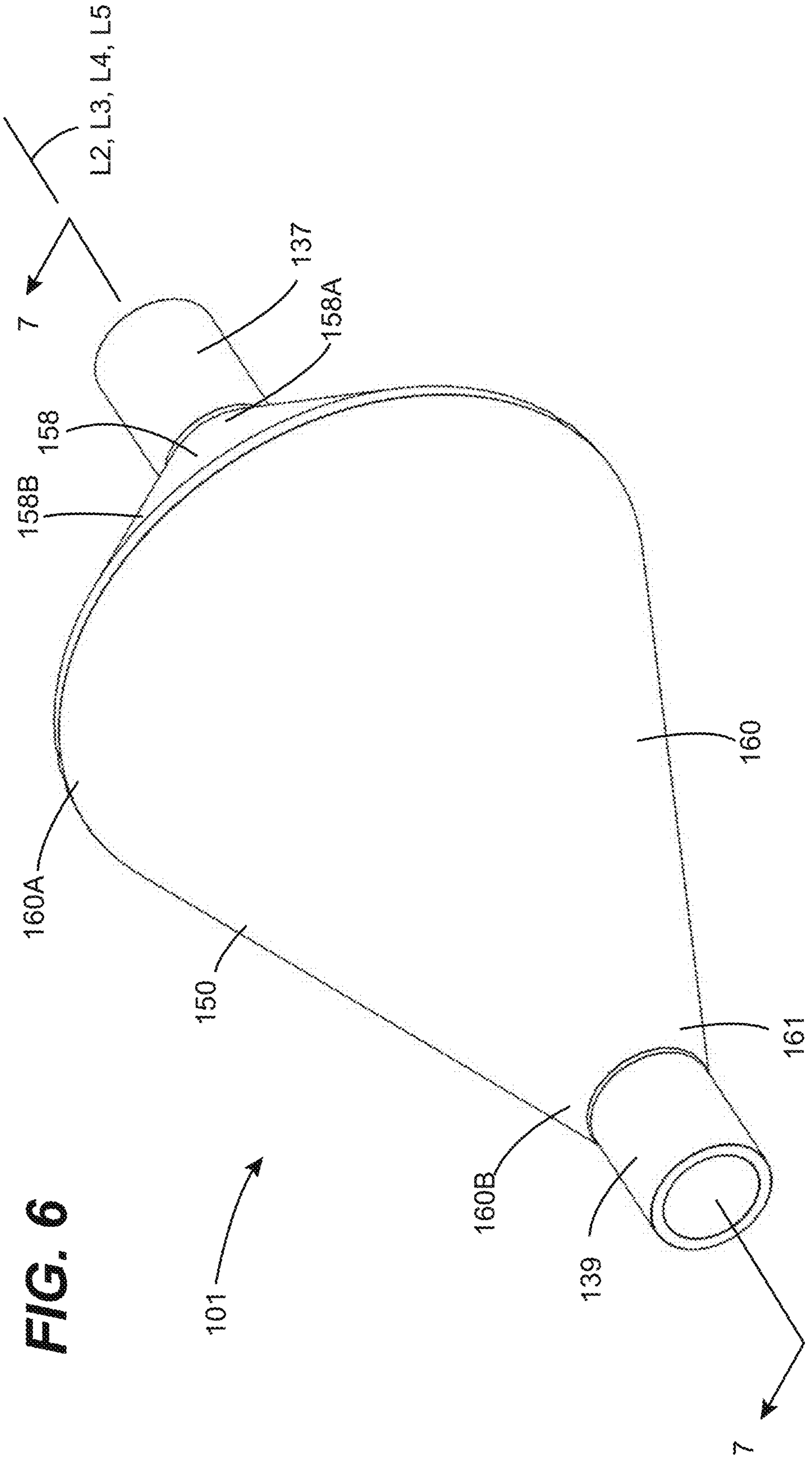
FIG. 6 is a first perspective view showing a material pressurizer configured in accordance with one or more embodiments of the disclosures made herein.
Figure 7:
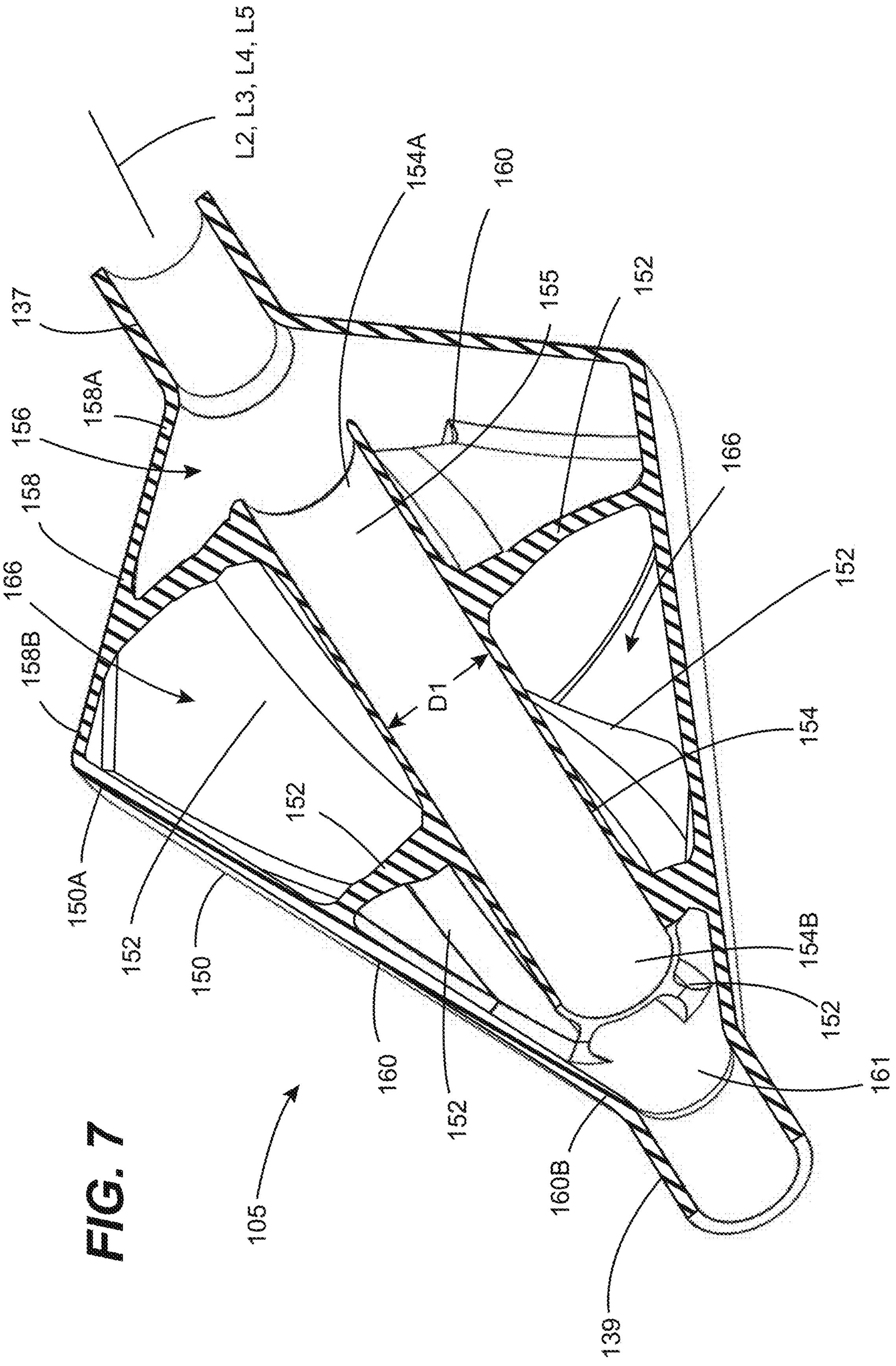
FIG. 7 is a cross-sectional view taken along the line 7-7 in FIG. 6.
Figure 8:
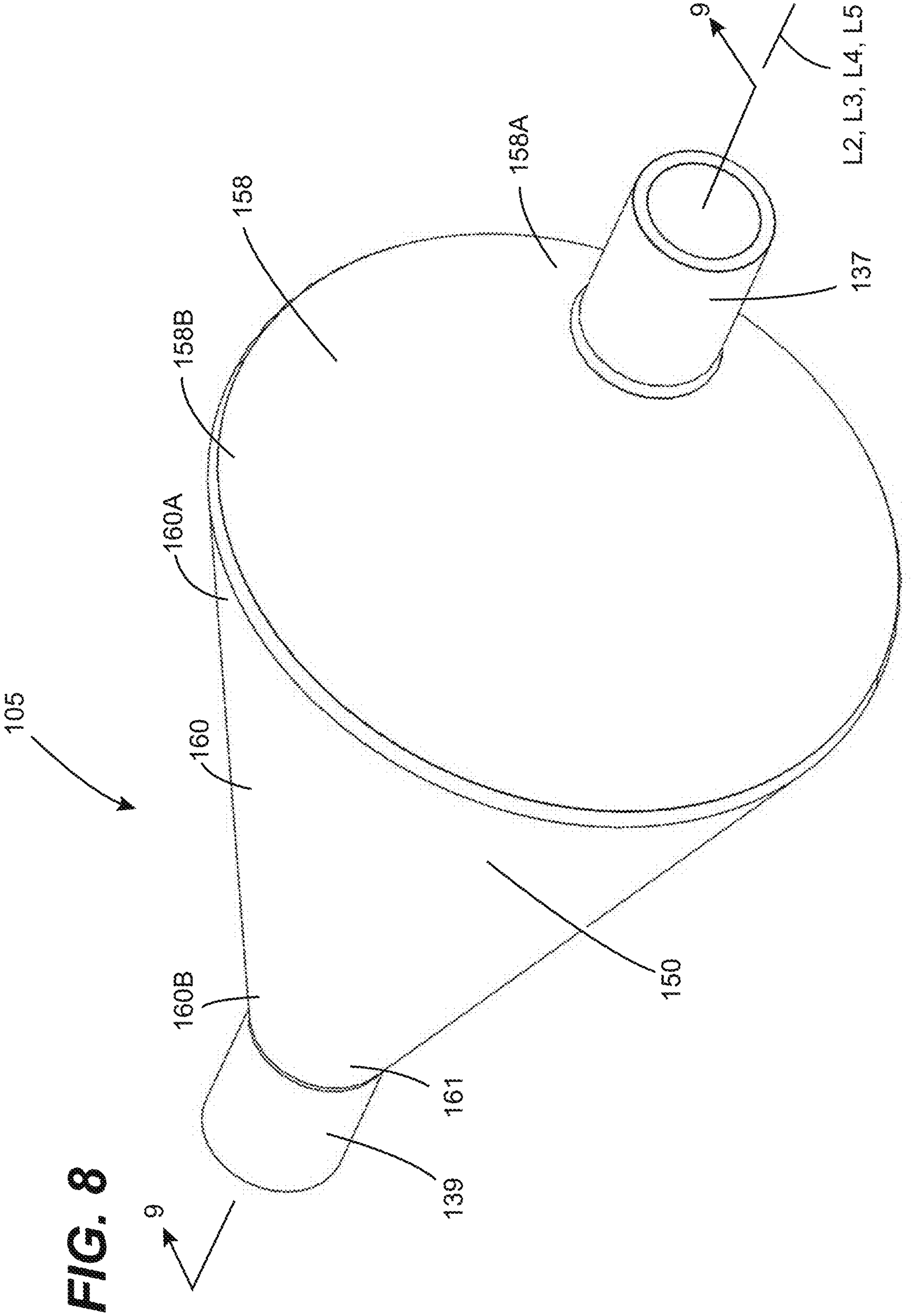
FIG. 8 is a second perspective view of the material pressurizer shown in FIG. 6.
Figure 9:
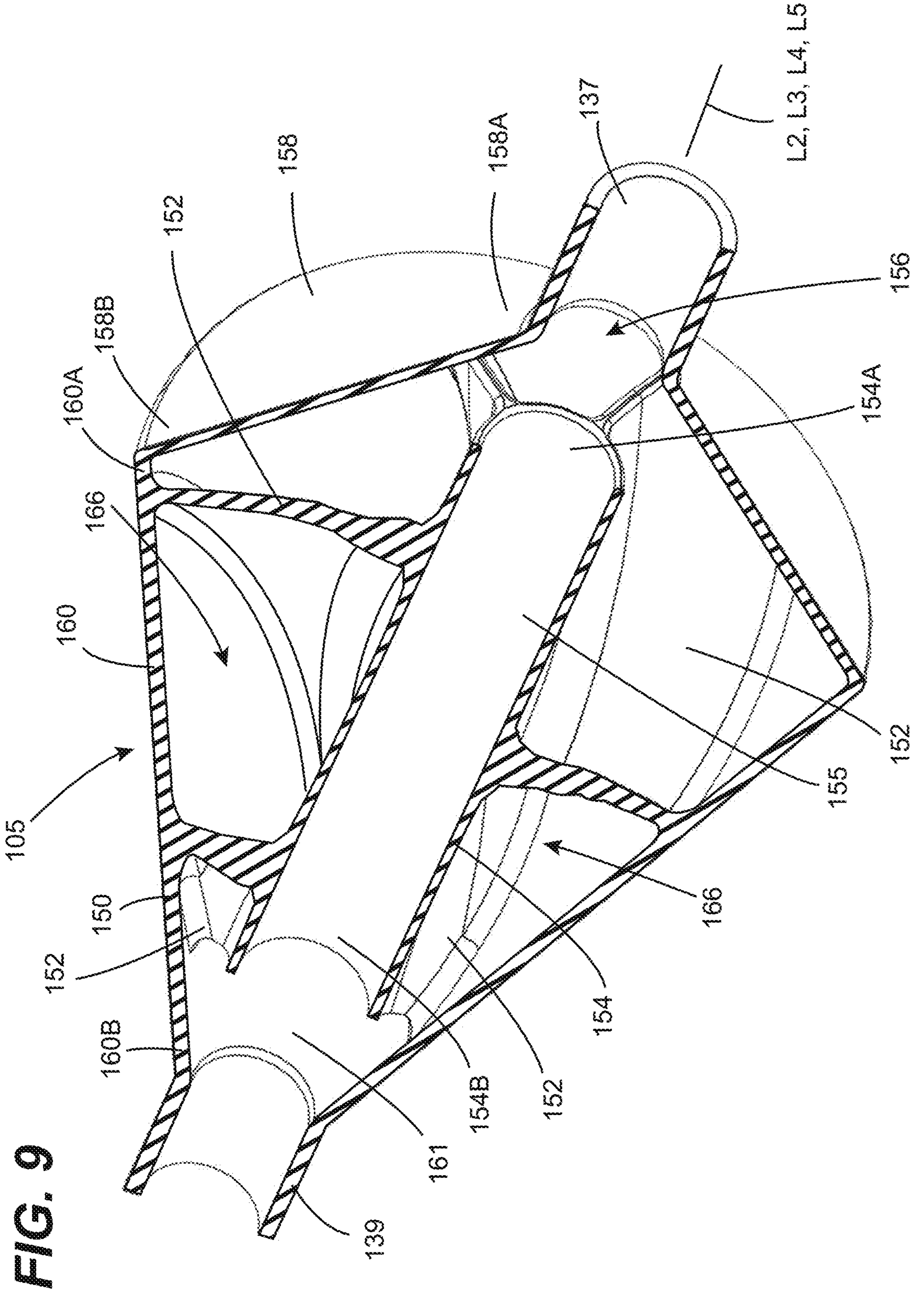
FIG. 9 is a cross-sectional view taken along the line 9-9 in FIG. 8.
Figure 10:
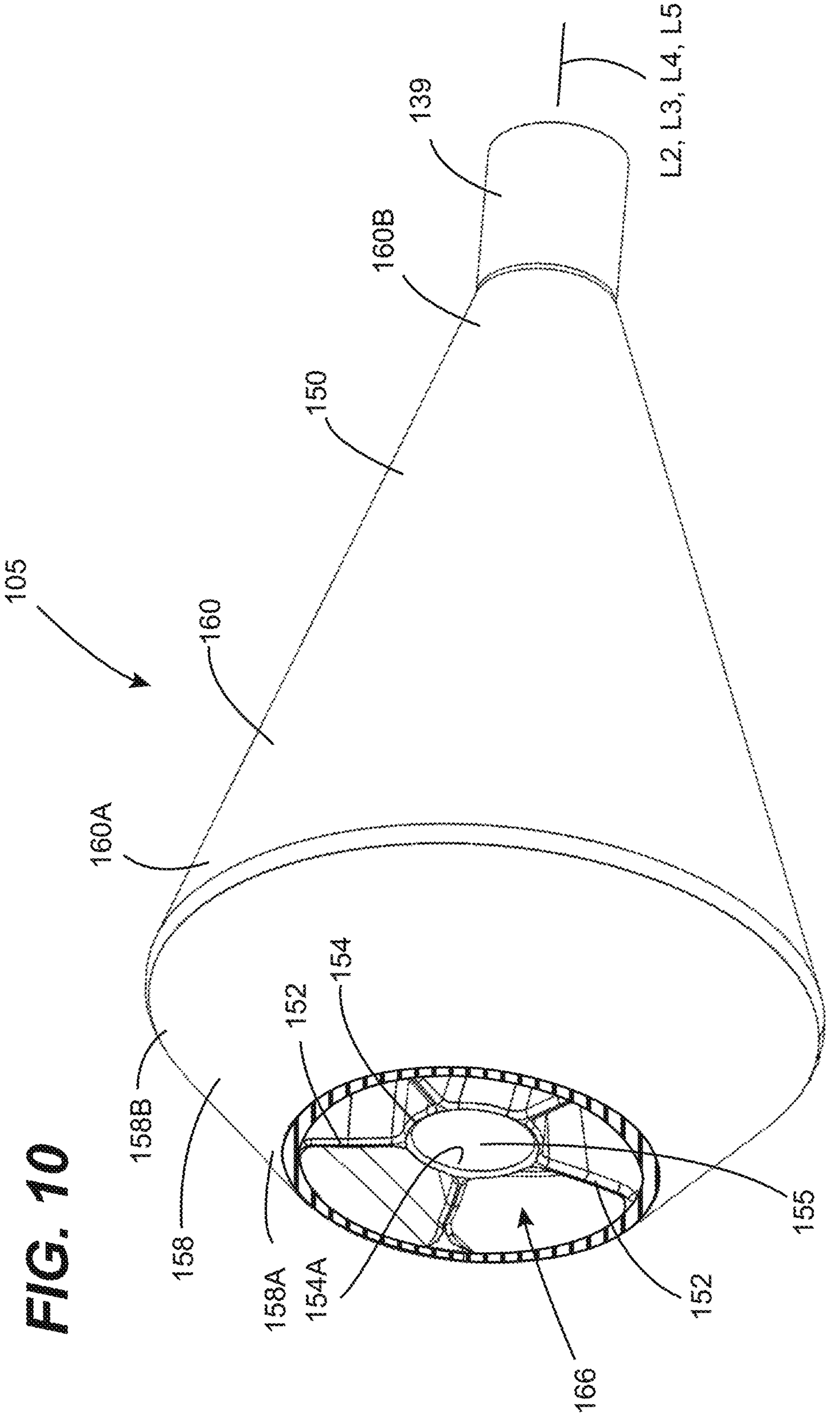
FIG. 10 is a cross-sectional view showing an upstream end portion of helical flow passages of the material pressurizer shown in FIG. 6.

Referring now to FIGS. 3-5, specific aspects of a rotary in-line pump system in accordance with one or more embodiments of the disclosures made herein (i.e., rotary in-line pump system 100) are discussed. The rotary in-line pump system 100 includes a material pressurizer 105, an upstream mounting unit 110, a downstream mounting unit 115 and a drive apparatus 120. The material pressurizer 105 and the mounting units 110, 115 jointly define a rotary in-line pump 101. The mounting units 110, 115 and a mounting base 125 of the drive apparatus 120 can be fixedly attached, directly or indirectly, to a support structure 130 (prior art) such as, for example, a concrete foundation, mounting body of an article or the like. Such attachment has the objective of securing the rotary in-line pump 101 and the drive apparatus 120 in fixed positional relationship relative to each other and to a fixed geospatial position.

The mounting units 110, 115 are each engaged with a respective portion of the material pressurizer 105 of the rotary in-line pump 101. The upstream mounting unit 110 is engaged with an upstream portion of the material pressurizer 105 and the downstream mounting unit 115 is engaged with a downstream portion of the material pressurizer 105. Engagement of the mounting units 110, 115 with the respective portion of the material pressurizer 105 and the attachment of the mounting units 110, 115 to the support structure 130 serves to fixedly constrain the material pressurizer 105 axially and radially with respect to a longitudinal reference axis L2 and to enable rotation of the material pressurizer 105 about the longitudinal reference axis L2. In one or more embodiments, each of the mounting units 110, 115 can include a support body 143 and a bearing assembly 145 that is coupled between the support body 143 thereof and a respective portion of the material pressurizer 105 to provide for enabling such axially and radially constraint of the material pressurizer 105 relative to the longitudinal reference axis L2 and for enabling such rotation of the material pressurizer 105 about the longitudinal reference axis L2. The bearing assembly 145 (or rotation enabling structure of the mounting units 110, 115) preferably suitably limit (e.g., eliminate) endplay from the material pressurizer 105 relative to the mounting units 110, 115. For example, the bearing assembly 145 can include a bearing mount 145A engaged with or unitary to the material pressurizer 105 and a bearing 145B having an inner race portion 145B' thereof mounted on the bearing mount 145A. An exterior race portion 145B" of the bearing 145B is engaged with a bearing engaging portion 143A of the support body 143 of the respective one of the mounting units 110, 115.

The material pressurizer 105 includes a pulley 140 (or other type of output energy receiving device) attached to a material inlet body 137 of the material pressurizer 105. The pump 101 receives rotational energy from the drive apparatus 120 through the pulley 140. The drive apparatus 120 includes a motor 142 (or other type of rotation force-generating device) and a pulley 144 (or other type of output energy device) attached to an output shaft 146 of the motor 140. A drive member 148 of the drive apparatus 120 is engaged between the pulley 140 of the material pressurizer 105 and the pulley 144 of the drive apparatus 120 for enabling rotational energy to be conveyed from the motor 142 to the material pressurizer 105.

It is disclosed that embodiments of the disclosures made herein are not limited to a particular type of configuration of drive apparatus. Drive apparatuses using a belt or the like for conveying rotational energy can be utilized as can be drive apparatuses using engaged rotating members such as gears, axles, and the like. Rotary in-line pump systems in accordance with embodiments of the disclosures made herein are not unnecessarily limited to a particular type or configuration of drive apparatus. In preferred embodiments, the rotational power can be delivered from the drive apparatus 120 to the pump 101 in a multiplied or reduced manner (e.g., preset or adjustable) whereby rotational speed of the material pressurizer 105 about the longitudinal reference axis L2 can be set at a desired level relative to an associated rotational speed of the output shaft 146 of the motor 142. In some instances, it will be preferred to drive the material pressurizer 105 at a rotational speed greater than that of the output shaft 146 of the motor 142. In other instances, it will be preferred to drive the material pressurizer 105 at a rotational speed less than that of the output shaft 146 of the motor 142. In these regards, rotary in-line pump system in accordance with one or more embodiments of the disclosures made herein can be adapted to achieve preset or adjustable torque multiplication between the material pressurizer 105 and the output shaft 146 of the motor 142.

As shown in FIGS. 3 and 4, the rotary in-line pump 101 can include an inertial device 149 that is externally mounted on or unitary formed with the material pressurizer 105. In one or more embodiments, the inertial device 149 can be a harmonic balancer, a flywheel, both a separate harmonic balancer and a separate flywheel or a combined device (i.e., a single unit) that provides the functionality of both the flywheel and the harmonic balancer. The harmonic balancer can be a portion of the inertial device 149 that is relatively close to the longitudinal reference axis L2. The objective of the harmonic balancer functionality is to eliminate all frequencies or at least critically adverse frequencies generated in the structure of the pump 101 up to at least a predetermined engineered gravitational force (i.e., gravitational force (32.2 ft/s^2)). In contrast, the objective of the flywheel functionality is to use inertial mass to help maintain rotational speed of the material pressurizer 105 (i.e., rotational momentum) by mitigating or eliminating rotational surges of the pump 101 that can arise from, for example, variable fluid densities, pipe volumes and the like.

Referring now to FIGS. 6-10, specific aspects of the material pressurizer 105 (i.e., a material pressurizer in accordance with one or more embodiments of the disclosure made herein) are disclosed. The material pressurizer 105 includes an exterior body 150, a plurality of helical vanes 152 and a centralizer tube 154. In some embodiments, the exterior body 150 can be a tubular body—e.g., having generally uniform thickness walls. The helical vanes 152 and the centralizer tube 154 are located within an interior space 156 of the exterior body 150. The exterior body 150 includes a conically divergent section 158 and a conically convergent section 160. The conically divergent section 158 and the conically convergent section 160 each have an upstream end portion 158A, 160A and a downstream end portion 158B, 160B. The downstream end portion 158B of the conically divergent section 158 is attached to the upstream end portion 160A of the conically convergent section 160. The centralizer tube 154 has an upstream end portion 154A located within the conically divergent section 158 and a downstream end portion 154B located within the conically convergent section 160. A longitudinal centerline axis L3 of the conically divergent section 158, a longitudinal centerline axis LA of the conically convergent section 160 and a longitudinal centerline axis L5 of the centralizer tube 154 extend colinearly with the longitudinal reference axis L2.

Each of the helical vanes 152 extends between an interior surface 162 of the exterior body 150 and an exterior surface 164 of the centralizer tube 154 at least partially along a length of the exterior body 150. This arrangement of helical vanes 152 relative to the interior surface 162 of the exterior body 150 and the exterior surface 164 of the centralizer tube 154 defines a plurality of helical flow passages 166. As can be seen, the helical flow passages 166 extend between the exterior body 150, the centralizer tube 154 and adjacent ones of the helical vanes 152. The divergent (i.e., tapered) conical profile of the exterior body 150 and the centralizer tube 154 having a generally cylindrical profile (i.e., inside diameter D1, shown in FIG. 7) results in the portions of the helical flow passages 166 within the conically divergent section 160 of the exterior body 150 (i.e., the divergent portion of the helical flow passages 166) being tapered from a cross-sectional area adjacent to the upstream end portion 158A of the conically divergent section 158 that is smaller than the cross-sectional area adjacent to the downstream end portion 158B of the conically divergent section 158. The convergent (i.e., tapered) conical profile of the exterior body 150 and the centralizer tube 154 having a generally uniform outside diameter (e.g., via cylindrical cross-sectional profile) results in the portions of the helical flow passages 166 within the conically convergent section 160 of the exterior body 150 (i.e., the convergent portion of the helical flow passages 166) being tapered from a cross-sectional area adjacent to the upstream end portion 160A of the conically convergent section 160 that is larger than the cross-sectional area adjacent to the downstream end portion 160B of the conically convergent section 160. The convergent portions of the helical flow passages 166 are in fluid communication with and extend from the divergent portions of the helical flow passages 166 such that each of the helical flow passages 166 is contiguous along a length thereof. Accordingly, operation of the pump 101 causes material being pump through the helical flow passages 166 to accelerate and to be transform from a laminar flow profile at the material flow inlet 137 of the exterior body 150 to a rotational flow profile at a material flow outlet 139 of the exterior body 150. For a given profile of the helical vanes 152, the profile of the interior surface of the exterior body 150 along its length and the profile of the exterior surface of the centralizer tube 154 along its length jointly define the profile of the helical flow passages 166.

In one or more embodiments, each of the helical flow passages 166 can extend along an entire length of the centralizer tube 154. In one or more embodiments, an inside diameter of the centralizer tube 154 can be uniform over an entire length of thereof. In one or more embodiments, the centralizer tube can have a cylindrical cross-sectional profile. In one or more embodiments, a maximum inside diameter of the exterior body 150 can be at least 4 times the inside diameter of the centralizer tube 154 and a minimum inside diameter of the exterior body is approximately the same as the inside diameter of the centralizer tube. In one or more embodiments, an inlet of each of the helical flow passages 166 and an inlet of the centralizer tube 154 can all lie in a common plane. In one or more embodiments, the material inlet body 137, the material outlet body 139 and the centralizer tube 154 can all have nominally the same inside diameter. In one or more embodiments, the material inlet body 137 can have an inside diameter substantially larger than that the of the material outlet body 139. In one or more embodiments, at least about 80% of a length of the centralizer tube 154 can reside within a portion of the interior space 156 of the exterior body 150 defined by the conically convergent section 160 thereof.

Each of the helical vanes 152 can be fully or partially attached (i.e., e.g., along one or more edge portions thereof) to the exterior body 150, to the centralizer tube 154 or a combination thereof. In one or more embodiments, the material pressurizer 105 can be formed in a one-piece manner using any suitable fabrication technique (e.g., molding, casting, machining, 3-D printing or the like) and from any suitable material (e.g., metallic material, polymeric material, ceramic material or the like). In one or more other embodiments, one or more components of the material pressurizer 105 can be manufactured as discrete components and subsequently attached to each other by means such as, for example, welding, ultrasonic bonding, adhesive, or the like.

The material flow inlet 137 and the material flow outlet 139 of the exterior body 150 are adapted for enabling attachment of a non-rotating material flow conduit thereto. It is disclosed herein that any suitable means for enabling such attachment of a non-rotating material flow conduit thereto may be used. For example, in one of more embodiments, a rotational-to-static connector 141 (e.g., a commercially-available or custom-fabricated swivel connector) can be attached to the material flow inlet 137 and to material flow outlet 139 for marrying the material flow inlet 137 and the material flow outlet 139 to stationary sections of the material flow conduit. In one or more embodiments, a lubrication system can be integrated into or attached to the rotational-to-static connector to provide intermittent or constant lubrication. Additionally, a thrust washer or other type of device can be added to mitigate or eliminate end-play and/or thermal expansion that may occur between the material pressurizer 105 and the connected non-rotating material flow conduits.

The region of the interior space 156 of the material pressurizer 105 that resides between the downstream end portion 154B of the centralizer tube 154 and the material flow outlet 139 is a flow mixer section 161 (i.e., convergence of the helical vanes 152, the central passage 155 of the centralizer tube 154 and tapered region of the exterior body 150 beyond the downstream end portion 154B of the centralizer tube 154). Each of the helical flow passages 166 and a central passage 155 of the centralizer tube 154 terminate at the flow mixer section 161, whereby material from therefrom flows into the flow mixer section 161. The flow mixer section 161 enhances cyclonic flow efficiency by focusing and centralizing flows toward the longitudinal reference axis L2. In preferred embodiments, the focal point of the cyclonic flow of the flowable material is located prior to the material flow outlet 139. Accordingly, in view of the disclosures made herein, a person of ordinary skill in the art will understand that the duration of strength of the cyclonic flow downstream of the pump 101 is defined by dimensional and structural attributes of the helical flow passages 166, the centralizer tube 154 and the flow mixer section 161.

In preferred embodiments, the inertial device 149 comprises a harmonic balancer attached to the exterior body 150 at a longitudinal location at or adjacent to the terminal end of the centralizer tube 154. Advantageously, this location of the harmonic balancer addresses vibration induced by convergence of the flow from the helical flow passages 166 and the central passage 155 of the centralizer tube 154.

Figure 11:
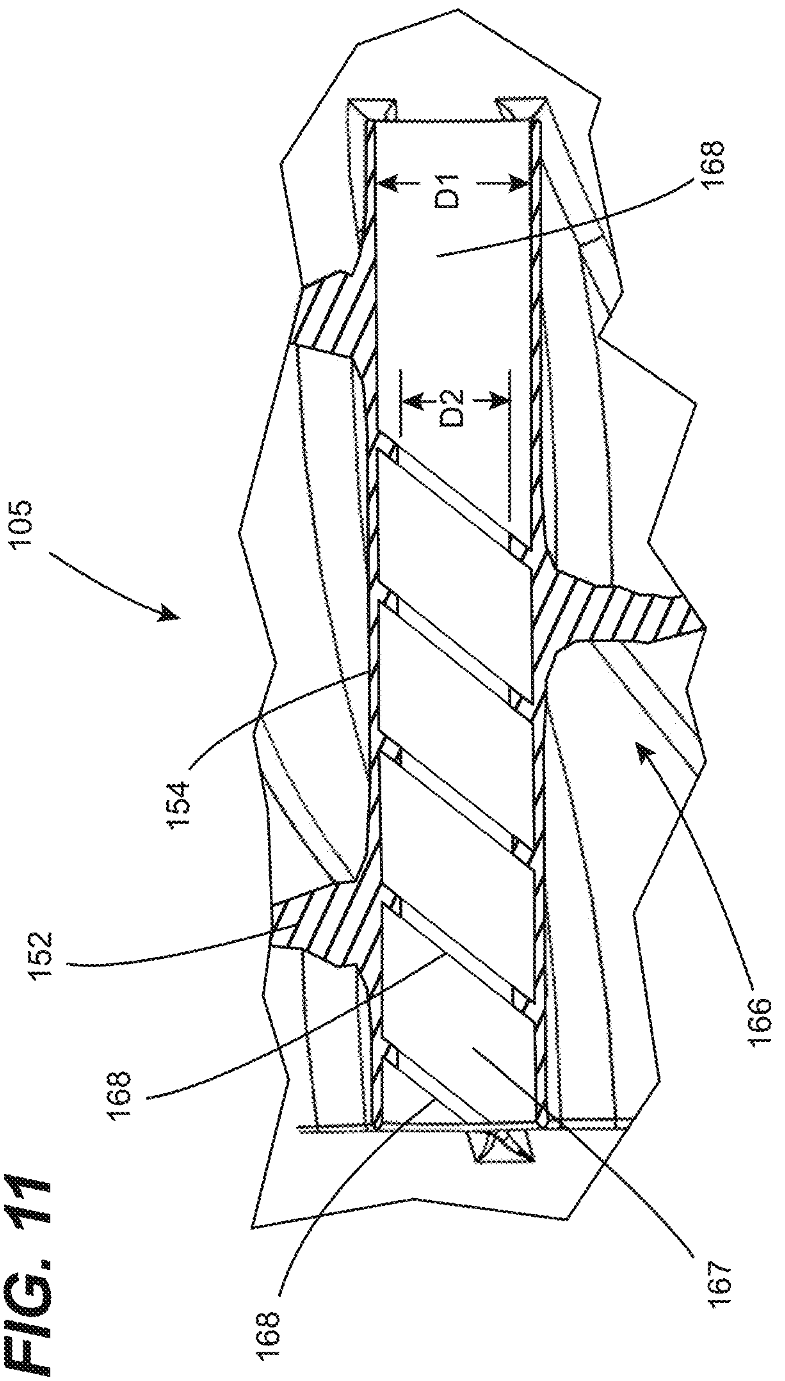
FIG. 11 is a cross-sectional fragmentary view showing a material pressurizer configured in accordance with one or more embodiments of the disclosures made herein, wherein a centralizer tube of the material pressurizer has a plurality of helical projections provided on an interior surface defining a central passage thereof.

In one or more embodiments of the disclosures herein, as shown in FIG. 11, a plurality of helical projections 168 (e.g., ribs, ridges, shoulders or the like) can be provided on the interior surface 167 defining the central passage 155 of the centralizer tube 154. The helical projections 168 have a height such that the helical projections 168 define a reduced diameter D2 relative to the inside diameter D1 of the central passage 155 of the centralizer tube 154. Preferably, the reduced diameter D2 is the same as or approximately the same as an inside diameter of the material flow inlet 137 and/or the material flow outlet 139 of the material pressurizer 105. In one or more embodiments, the helical projections 168 can extend along an entire length of the centralizer tube 154 or can extend partially along an entire length of the centralizer tube 154 (e.g., extending from the inlet of the centralizer tube 154 to an intermedial location thereof, extending from an intermedial location to the centralizer tube 154 to an outlet of the centralizer tube 154 or any segment therebetween).

In one or more embodiments, a pitch of the helical projections 168 can be the same as a pitch of each of the helical vanes 152. It is disclosed herein the pitch of the helical projections 168 and/or the pitch of each of the helical passages 166 can be constant (i.e., uniform) over the length of thereof or variable over the length thereof. In preferred embodiments, the variable pitch has a looser pitch adjacent to an inlet of the passage and a tighter pitch adjacent an outlet of the passage.

Discussed now are various advantageous aspects of rotary in-line pumps in accordance with embodiments of the disclosures made herein. One such advantageous aspect is that the incorporation of the centralizer tube and resulting helical flow passages provide for cyclonic flow. Such cyclonic flow is characterized by a "top end" or head that is generated by the upstream end portion of the material pressurizer 105 and by omnidirectional flow (i.e., generally equal flow in all directions perpendicular to the axis of rotation). Each of the helical flow passages then uses the imparted energy (i.e., energy from rotational motion of the material pressurizer 105) and velocity of the material flow to generate several stream vanes of material flow (i.e., helical flow streams) that unite with each other in the flow mixer section 161 and with the material flow of a centralized flow stream (i.e., flow of the centralizer tube 154). These material flows are then focused by the flow mixer section 161 to the centerline of the material pressurizer 105 (i.e., the longitudinal reference axis L2), thereby forming the "tail end" of the cyclonic flow. Beneficially, the flow mixer section 161 further enhances cyclonic flow and distributes an even (i.e., balanced) cyclonic flow profile about the centerline of the material pressurizer 105. Advantageously, inner sidewall conditions of material flow conduit (e.g., pipeline) downstream of the pump 101 has a negligible effect on the cyclonic flow. Although there is a great deal of energy loss from a fluid going through certain disruptive material flow attributes of material flow conduits (e.g., a valve, fitting, or turbulence created going from passing fluid from one pipe size to another), cyclonic flow mitigates energy loss from these disruptive material flow attributes of material flow conduits by providing for concentration of material flow along the centerline of material flow conduit downstream of the pump 101 thereby reducing sidewall drag and flow resistance.

Another advantageous aspect of rotary in-line pumps in accordance with one or more embodiments of the disclosures made herein is providing for "soft reverse flow". With such soft reverse flow, if there is ever a back flow surge in a system comprising one or more rotary in-line pumps in accordance with one or more embodiments of the disclosures made herein, each of the one or more rotary in-line pumps serves to beneficially reduce the backflow (i.e., flow in the upstream direction). More specifically, in a reverse flow scenario, flowable material enters the helical flow passages from the flow mixer and then dead heads into the 'funnel' of the conically divergent section 158 of the material pressurizer 105, which creates a controlled flow blockage (i.e., controlled funnel flow). In this regard, soft reverse flow is enabled by inclusion of helical flow passages defined between the exterior body, the centralizer tube and adjacent helical vanes. Such soft reverse flow beneficially does not fully inhibit backflow, which would create a shock wave that is harmful to the structures of the material flow conduit, and to the rotary in-line pump(s).

Still another advantageous aspect of rotary in-line pumps in accordance with embodiments of the disclosures made herein is that they are fully "piggable", as required by the certified in accordance the American Petroleum Institute API-570 inspection process. The oil and petroleum industry require components of pipeline structures to be piggable, which is a process that includes but is not limited to cleaning and inspection of the pipeline interior by deploying a "pigging device" that travels within the pipeline. To this end, rotary in-line pumps in accordance with embodiments of the disclosures made herein permit the pigging device to travel non-obtrusively therethrough regardless of the types of sections that the pipeline includes (e.g., straight line, short radius elbows, long radius elbows, 'Y' fittings, laterals, ellipse, and semi-ellipse cross sections of the pipeline).

The pigging device has an elongated body with a perimeter seal at each of its ends. The perimeter seals have a size whereby they maintain engagement with an inside diameter of a material flow conduit (e.g., pipeline) to support a pressure drop across the length of the pigging device. It is this pressure drop that serves to propel the pigging device along then length of the material flow conduit. This being the case, rotary in-line pumps in accordance with embodiments of the disclosures made herein are configured to maintain engagement between at least one of the perimeter seals and the inside diameter of a material flow conduit and/or rotary in-line pump. More specifically, the length of the centralizer tube of a rotary in-line pump in accordance with embodiments of the disclosures made herein has a length that provides for such seal with the pigging device as it enters and leaves the rotary in-line pumps. As the pigging device passes through the rotary in-line pump, at least one of the perimeter seals is either within portion of the material flow conduit upstream or downstream of the rotary in-line pump or is within the centralizer tube. In some embodiments, the flow inlet structure and/or flow outlet structure can be configured to provide for such seal with the pigging device as it enters and/or leaves the rotary in-line pump.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A pump, comprising:

a material pressurizer including an exterior body, a centralizer tube, and a plurality of helical vanes each extending between the exterior body and the centralizer tube at least partially along a length of the exterior body to jointly define a plurality of helical flow passages, wherein the exterior body includes a divergent section and a convergent section extending from the divergent section, wherein a first portion of the centralizer tube extends at least partially along a length of the divergent section and a second portion of the centralizer tube extends at least partially along a length of the convergent section, wherein the divergent section and the convergent section are attached to each other such that a maximum diameter of the exterior body is located between opposing end portions thereof, wherein a centerline longitudinal axis of the divergent section extends colinearly with a centerline longitudinal axis of the convergent section, and wherein the divergent section and the convergent section are conically-shaped.

2. The pump of claim 1 wherein a length of the centralizer body is less than a combined length of the divergent section and the convergent section.

3. A pump, comprising:

a material pressurizer including an exterior body, a centralizer tube, and a plurality of helical vanes each extending between the exterior body and the centralizer tube at least partially along a length of the exterior body to jointly define a plurality of helical flow passages, wherein the exterior body includes a divergent section and a convergent section extending from the divergent section and wherein a first portion of the centralizer tube extends at least partially along a length of the divergent section and a second portion of the centralizer tube extends at least partially along a length of the convergent section; and a plurality of mounting units each engaged with a respective portion of the material pressurizer to enable rotation of the material pressurizer about a longitudinal reference axis, wherein a longitudinal centerline axis of the exterior body and a longitudinal centerline axis of the centralizer tube extend colinearly with the longitudinal reference axis.

4. The pump of claim 3 wherein;

a first one of the mounting units is engaged with at least one of the divergent section and a material inlet body of the exterior body; and a second one of the mounting units is engaged with at least one of the convergent section and a material outlet body of the exterior body.

5. The pump of claim 3 wherein:

the exterior body includes a material inlet body at an upstream end portion thereof and a material outlet body at a downstream end portion thereof; and a longitudinal centerline axis of the material inlet body and a longitudinal centerline axis of the material outlet body each extend colinearly with a centerline longitudinal axis of the centralizer body.

6. The pump of claim 5 wherein the centralizer tube and at least one of the material inlet body and the material outlet body each have a common inside diameter that is uniform over an entire length of thereof.

7. The pump of claim 5 wherein each of the helical flow passages extends along an entire length of the centralizer tube.

8. The pump of claim 7 wherein:

the divergent section and the convergent section are attached to each other such that a maximum diameter of the exterior body is located between opposing end portions thereof, and at least one of the divergent section and the convergent section is conically-shaped.

9. The pump of claim 8 wherein the centralizer tube and at least one of the material inlet body and the material outlet body each have a common inside diameter that is uniform over an entire length of thereof.

10. The pump of claim 7 wherein at least one of:

an inside diameter of the centralizer tube is uniform over an entire length of thereof; and a length of the centralizer body is less than a combined length of the divergent section and the convergent section.

11. The pump of claim 5 wherein at least one of:

an inside diameter of the centralizer tube is uniform over an entire length of thereof; and a length of the centralizer body is less than a combined length of the divergent section and the convergent section.

12. A pump, comprising:

a material pressurizer including an exterior body, a centralizer tube, and a plurality of helical vanes each extending between the exterior body and the centralizer tube at least partially along a length of the exterior body to jointly define a plurality of helical flow passages, wherein the exterior body includes a divergent section and a convergent section extending from the divergent section, wherein a first portion of the centralizer tube extends at least partially along a length of the divergent section and a second portion of the centralizer tube extends at least partially along a length of the convergent section, and wherein each of the helical flow passages extends along an entire length of the centralizer tube.

13. The pump of claim 12 wherein an inside diameter of the centralizer tube is uniform over an entire length of thereof.

14. The pump of claim 12 wherein a length of the centralizer body is less than a combined length of the divergent section and the convergent section.

15. The pump of claim 14 wherein an inside diameter of the centralizer tube is uniform over an entire length of thereof.

16. The pump of claim 12 wherein:

the divergent section and the convergent section are attached to each other such that a maximum diameter of the exterior body is located between opposing end portions thereof, and at least one of the divergent section and the convergent section is conically-shaped.

17. The pump of claim 16 wherein at least one of:

an inside diameter of the centralizer tube is uniform over an entire length of thereof; and an inside diameter of the centralizer tube is uniform over an entire length of thereof.

18. A pump, comprising:

a material pressurizer including an exterior body, a centralizer tube, and a plurality of helical vanes each extending between the exterior body and the centralizer tube at least partially along a length of the exterior body to jointly define a plurality of helical flow passages, wherein the exterior body includes a divergent section and a convergent section extending from the divergent section, wherein a first portion of the centralizer tube extends at least partially along a length of the divergent section and a second portion of the centralizer tube extends at least partially along a length of the convergent section, wherein an inlet of each of the helical flow passages and an inlet of the centralizer tube all lie in a common plane, and wherein at least one of: an inside diameter of the centralizer tube is uniform over an entire length of thereof; and a length of the centralizer body is less than a combined length of the divergent section and the convergent section.

* * * * *